Patented Aug. 26, 1952

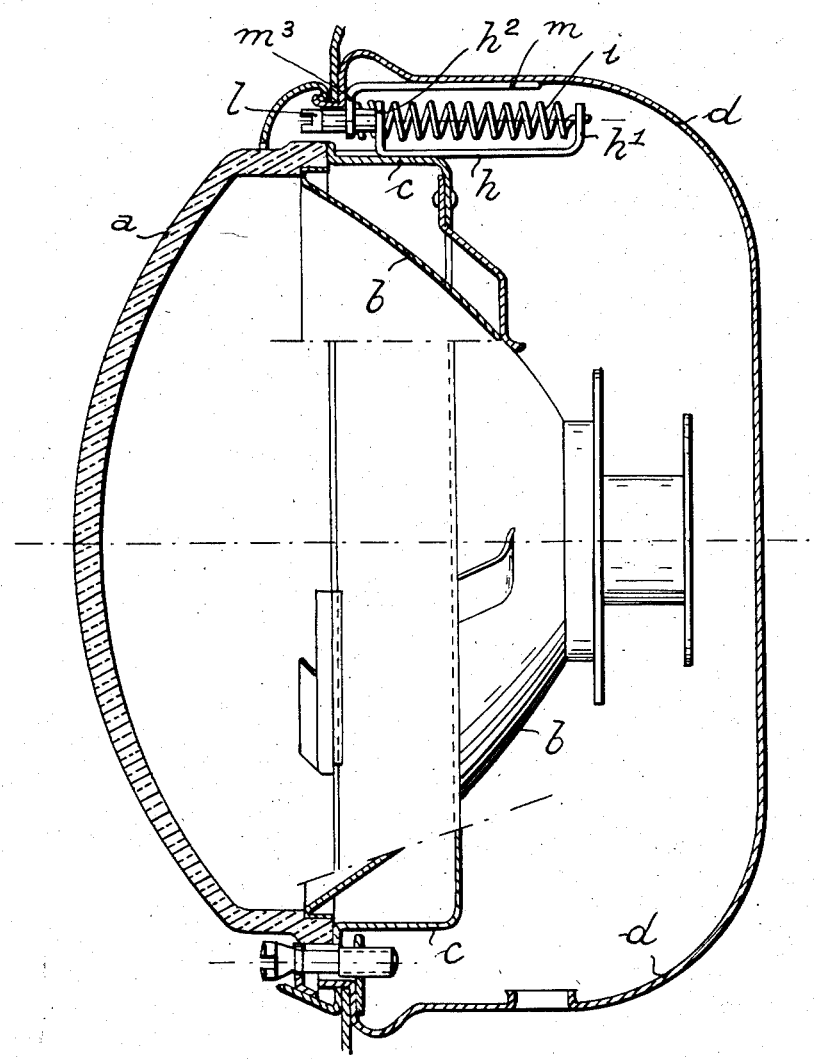

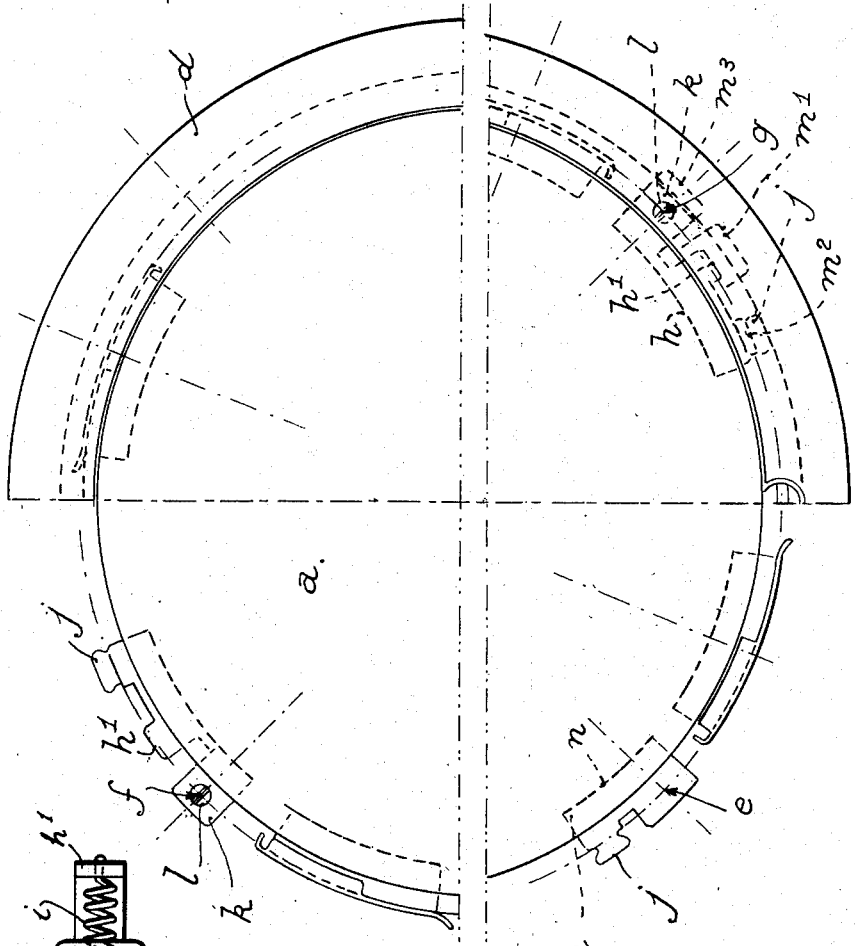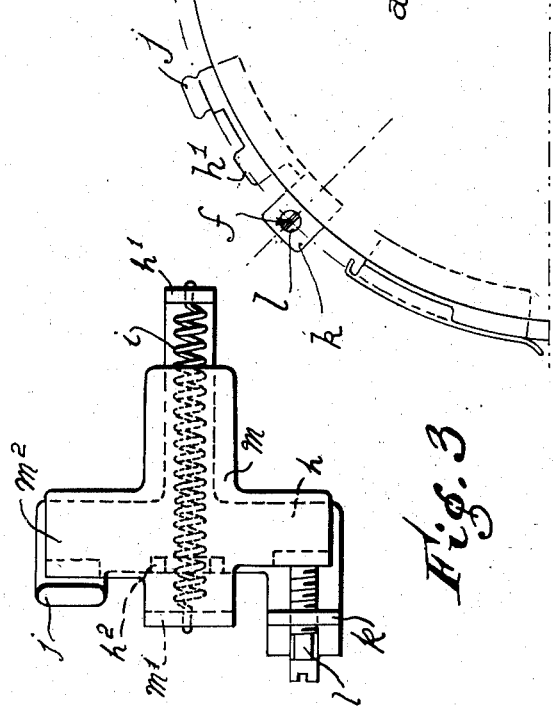

2,608,642

UNITED STATES PATENT OFFICE 2,608,642

HEADLIGHT MOUNTING AND ADJUSTING ARRANGEMENT

Pierre Cibié, Paris, France

Application March 25, 1947, Serial No. 737,168
In France August 13, 1945

Section 1, Public Law 690, August 8, 1946
Patent expires August 13, 1965

3 Claims. (Cl. 240—41.5)

This invention relates to headlights for motor vehicles and it has for its object an improved headlight.

It is known that, for the purpose of improving the appearance of automobile vehicles, headlights are constructed, the body of which is of one piece with the wings or with the body-work of the car. When this is the case, it is necessary to dispose the optical system in such a way that it is adjustable in direction in the body provided for it.

The arrangement for the adjustment of the direction of the optical system must however be so designed as to occupy as small a bulk as possible, so that the useful diameter of the headlight reflector may be as large as possible with respect to the total bulk of the headlight.

The improved headlight which is the object of the invention is designed with a view to fulfill these conditions.

According to my invention, I provide a headlight for automobile vehicles in which the various means for securing the optical system inside the body and for performing its adjustment in direction, namely: the bayonet fittings, adjusting screws, guiding brackets and positioning springs are disposed peripherally, one following the other so that the radial space occupied by the mechanical fittings may be as small as possible with respect to the useful diameter of the optical system.

The optical system is constituted, in the known manner, either by a reflector mounted directly on the glass front, or by a reflector, a glass front and a hoop for the assembling of these two elements together. It comprises bayonet fittings which, in the first case, are in glass and are part of the glass front and, in the second case, are separate pieces fixed on the assembling hoop.

The adjusting mechanism comprises brackets for the assembling by means of the bayonet fittings; it comprises besides three elements fixing the optical system to the body of the headlight, one forming a hinged joint and the two others adjustable by means of set screws.

Each adjusting device comprises three distinct elements, namely: a member fixed to the hoop of the reflector and provided with the parts required for attaching the positioning springs and controlling their action; a bracket for the adjustment in direction of the optical system with respect to the body and a bracket constituting a nut for the adjusting screw. These three elements are disposed peripherally, one following the other. Devices corresponding to these are provided in the body, and comprise three lugs disposed peripherally in a similar manner, the first being provided for hooking the end of the spring, the second being pierced with a hole to receive the guiding lug and the third acting as support for the adjusting screw. The optical system under the action of the positioning springs is applied on the body by means of the screws the operation of which ensures the adjustment. Owing to the peripheral disposition of the fixing and adjusting members, the mechanical fittings occupy radially a minimum space and allow in this way to obtain the maximum useful diameter for the reflector and the glass front of the headlight.

The appended drawings represent a manner of carrying out the construction of an improved headlight, made in conformity with the present invention.

The Fig. 1 of these drawings is a vertical section of the headlight.

The Fig. 2 is a front view of it, in four partial sections.

Figure 3 is a plan view of the adjusting means appearing at the top of Figure 1.

As it is seen in these drawings, the glass front of the headlight, $a$, is supposed here to be directly assembled with the reflector $b$, which is itself rigidly but detachably secured to a hoop $c$ by means of bayonet connections. This hoop is connected to the body of the headlight $d$, at three points which constitute the points of adjustment of the optical system: the point $e$ forming the fixed point and the hinged joint and the points $f$ and $g$ constituting the moveable points, which can be displaced by means of the set screws (see Fig. 2).

At each of the adjusting points is soldered, riveted or secured to the hoop $c$, in any suitable manner, a member $h$ comprising brackets $h^1$ and $h^2$ used respectively to attach and to control the action of the positioning spring $i$. On either side of these brackets are provided on the one hand a lug $j$ determining the direction of the optical system with respect to the body $d$ and, on the other hand, a bracket $k$ provided with a threaded hole, forming a nut in which passes the adjusting screw $l$.

A corresponding member $m$ is also fixed to the body $d$, similarly comprising a bracket $m^1$ for hooking the other end of the positioning spring $i$, a bracket $m^2$ to engage the lug $j$ and a bracket $m^3$ on which rests the adjusting screw $l$.

It will be understood that the positioning springs $i$, exerting in this way their action between the member $h$—$h^1$ fixed to the hoop connected to the reflector and the member $m—m^1$ fixed to the body, will maintain the optical system applied against the body of the headlight, the operation of the adjusting screws $l$ permitting the suitable adjustment of this optical system in direction with respect to the body $d$ simply by adjusting the tension of the positioning springs.

It is seen that, owing to the peripheral disposition of the elements disposed at the adjusting points and at the fixed jointing point, the radial bulk of the optical system is reduced to a minimum so that this system can have the maximum useful diameter.

What I claim is:

1. A lamp arrangement for use as a headlight and the like comprising in combination a lighting unit; a cup-shaped casing disposed to the rear of said lighting unit; a mounting ring provided on said lighting unit; oppositely disposed mounting elements, one secured to said casing and the other secured to said mounting ring; three circumferentially spaced portions formed on each of said mounting elements, the said portions thus being arranged in three pairs; position adjusting means in form of a cooperating screw and nut supported by one of said pairs of portions; a spring having its ends supported by the second pair of said portions; and a cooperating lug and bracket formed by the third pair of portions.

2. A lamp arrangement as claimed in claim 1 including a fourth portion formed on one of said mounting elements for guiding said spring.

3. A lamp arrangement as claimed in claim 1 including cooperating projections on said casing and said mounting ring, the said projections providing an articulation between said lighting unit and said casing.

PIERRE CIBIÉ.

REFERENCES CITED

The following references are of record in the file of this patent:

UNITED STATES PATENTS

| Number | Name | Date |
|---|---|---|
| 1,611,902 | Foster | Dec. 28, 1926 |
| 2,138,075 | Taylor et al. | Nov. 29, 1938 |
| 2,218,326 | Anklam | Oct. 15, 1940 |
| 2,266,329 | Mead et al. | Dec. 16, 1941 |